United States Patent
Han

(10) Patent No.: US 7,733,166 B2
(45) Date of Patent: Jun. 8, 2010

(54) EQUALIZER FILTERS INCLUDING A LOW-PASS FILTER UNIT AND AN EQUALIZER HAVING A GROUP DELAY CONTROL UNIT AND RELATED METHODS

(75) Inventor: Yun-Cheol Han, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 92 days.

(21) Appl. No.: 12/201,052

(22) Filed: Aug. 29, 2008

(65) Prior Publication Data

US 2009/0072896 A1    Mar. 19, 2009

(30) Foreign Application Priority Data

Sep. 17, 2007    (KR) ..................... 10-2007-0094190

(51) Int. Cl.
*H03B 1/00*    (2006.01)
(52) U.S. Cl. ..................................... 327/553
(58) Field of Classification Search ............... 327/551, 327/552, 553, 558
See application file for complete search history.

(56) References Cited

U.S. PATENT DOCUMENTS 6,373,332 B2 *    4/2002    Kawai ...................... 327/556

FOREIGN PATENT DOCUMENTS

| JP | 06-276050 | 9/1994 |
| JP | 08-298436 | 11/1996 |
| JP | 2002-008314 | 1/2002 |

* cited by examiner

*Primary Examiner*—Jeffrey S Zweizig
(74) *Attorney, Agent, or Firm*—Myers Bigel Sibley & Sajovec

(57) ABSTRACT

Provided is a filter used for an equalizer, the filter including: a first low-pass filter unit receives an input signal and performs low frequency band filtering on the input signal; and an equalization unit that receives an output signal from the first low-pass filter unit. The equalization unit may comprise a plurality of serially connected biquad low-pass filter units, and may control a value of a capacitor that is used to control a group delay value that is generated during equalization. Thus, the filter can compensate for group delay without including a separate all pass filter, thereby reducing surface area and power consumption.

25 Claims, 5 Drawing Sheets

EQUALIZER FILTERS INCLUDING A LOW-PASS FILTER UNIT AND AN EQUALIZER HAVING A GROUP DELAY CONTROL UNIT AND RELATED METHODS

CROSS-REFERENCE TO RELATED PATENT APPLICATION

This application claims priority under 35 U.S.C. §119 from Korean Patent Application No. 10-2007-0094190, filed on Sep. 17, 2007 in the Korean Intellectual Property Office, the disclosure of which is incorporated herein in its entirety by reference as if set forth fully herein.

FIELD OF THE INVENTION

The present invention relates to equalizers and, more particularly, to filters for equalizers that compensate for group delay.

BACKGROUND

Equalizers are widely used in many electronic devices. For example, FIG. 1 illustrates an optical recording/reproducing apparatus 100. As shown in FIG. 1, the optical recording/reproducing apparatus 100 includes an optical recording medium 101, an optical pick up unit 103, an analog front end (AFE) unit 120, a digital signal processor (DSP) 107, a decoder 109, a host interface (I/F) 111, and a host 113.

The optical recording medium 101 may be any medium capable of storing data and of having data read therefrom. There are various kinds of optical recording media including, for example, compact disc-recordable (CD-R), compact disc-rewritable (CD-RW), digital versatile disc-recordable (DVD-R), and so forth.

The optical pick up unit 103 may include laser diodes for respective wavelengths, a plurality of passive optical devices, a plurality of light receiving devices, and a plurality of passive optical device control operating devices. The optical pick up unit 103 is used to reproduce data stored in the optical recording medium 101, or is used as a signal sensor or control device for recording data transmitted from the host 113 onto the optical recording medium 101.

The AFE unit 120 records data in the optical recording medium 101, and then converts the data recorded in the optical recording medium 101 into radio frequency (RF) data signals.

The DSP 107 converts the RF signals into digital signals. The decoder 109 encodes the digital signals in such a manner that the error rate of the converted data is minimized. The host I/F 111 functions as an interface between the host 113 and the decoder 109. The host 113 may be, for example, a personal computer (PC).

The reproduction operation of the optical recording/reproducing apparatus 100 may proceed as follows.

First, the optical pickup unit 103 irradiates light onto the optical recording medium 101, and light that is reflected is received by the optical pickup unit 103. RF signals are then generated by reading mark and space patterns on the optical recording medium 101 by using a diffraction optics phenomenon. The AFE unit 120 amplifies and standardizes the RF signals. By passing through the DSP 107, the RF signals are converted into square wave signals. By passing through the decoder 109, the RF signals are encoded and are converted into data that can be recognized by the host 113.

The AFE unit 120 converts the data read from the optical recording medium 101 into RF signals. The data read from the optical recording medium 101 is converted into RF signals by passing the data through a filter that is included in the AFE unit 120. As the RF signals pass through the filter, a time delay occurs. In other words, after passing through the filter, an input signal is output such that the waveform of the input signal is delayed a little on a time axis, as if having a phase shift. The time delay that is caused by passing a signal through the filter is called group delay.

In addition to delaying a signal, group delay may also distort the signal. If the group delay is large, the phase of the frequency band through which signals pass may also be distorted. Irregular phase shift in the frequency band causes signal distortion. For example, when group delay is generated in the filter, an input RF signal having a mark length of 5 T may be output as a signal having a mark length of 4 T. Such a signal distortion may result in incorrect data being output from the optical recording/reproducing apparatus 100.

SUMMARY

Pursuant to embodiments of the present invention, filters for an equalizer are provided that include a first low-pass filter unit that is configured to receive an input signal and an equalization unit that is configured to (1) receive an output signal of the first low-pass filter unit and (2) amplify the received output signal with variable gain value. In these filters, the equalization unit comprises a plurality of serially connected biquad low-pass filter units. The equalization unit is configured to control a value of a capacitor of the last of the biquad low-pass filter units to control a group delay value that is generated during equalization.

In these filers, the equalization unit may further include a boosting block that is connected in parallel to the first of the plurality of biquad low-pass filter units. Each of the biquad low-pass filter units may comprise two transconductance-capacitor $g_m$-C filters, and the first low-pass filter unit may comprise a $g_m$-C filter.

In some embodiments, the plurality of serially connected biquad low-pass filter units may comprise n biquad low-pass filter units that form a second amplifier, where the $k^{th}$ biquad low-pass filter unit refers to the biquad low-pass filter that is connected to the $k^{th}$ of the n biquad low-pass filter units. In such embodiments, the $k^{th}$ biquad low-pass filter unit may comprise a first $g_m$ amplifier that has an input terminal that is connected to an output terminal of the $(k-1)^{th}$ biquad low-pass filter unit; a second $g_m$ amplifier that has an input terminal that is connected to an output terminal of the first $g_m$ amplifier, and that has an output terminal that is connected to an input terminal of the $(k+1)^{th}$ biquad low-pass filter unit; a third $g_m$ amplifier that has an input terminal that is connected to the output terminal of the second $g_m$ amplifier, and that has an output terminal that is connected to the output terminal of the second $g_m$ amplifier; a fourth $g_m$ amplifier that has an input terminal that is connected to an output terminal of the third $g_m$ amplifier and that has an output terminal that is connected to the output terminal of the first $g_m$ amplifier; a second capacitor that has a first terminal that is connected to the output terminal of the first $g_m$ amplifier and a second terminal that is connected to a reference voltage; and a third capacitor that has a first terminal that is connected to the output terminal of the second $g_m$ amplifier and a second terminal that is connected to the reference voltage.

Pursuant to further embodiments of the present invention, equalizer filters are provided that include an equalization unit that has a plurality of serially connected biquad low-pass filters and an adjustable capacitor. In these embodiments, the equalization unit is configured to amplify an input signal with a variable gain and to control a group delay value that is generated during equalization. These equalizer filters further include a low-pass filter having an output that is connected to an input of the equalization unit.

Pursuant to still further embodiments of the present invention, methods of processing an output signal of an optical pick-up unit are provided in which the output signal of the optical pick-up unit is passed through a low pass filter. A value of a capacitor of an equalization unit is adjusted to reduce a group delay characteristic of the equalization unit for the filtered output signal. This may be done in advance of passing the output signal of the optical pick-up unit through the low pass filter. The filtered output signal (i.e., the output signal of the optical pickup unit that has been passed through the low pass filter) is passed through the equalization unit.

The filters for an equalizer according to embodiments of the present invention and associated methods can compensate for group delay without an all pass filter, thereby reducing the surface area and power consumption of the filter.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this disclosure and the relevant art and will not be interpreted in an idealized or overly formal sense unless expressly so defined herein.

The present invention will now be described more fully with reference to the accompanying drawings, in which exemplary embodiments of the invention are shown.

Figure 2:
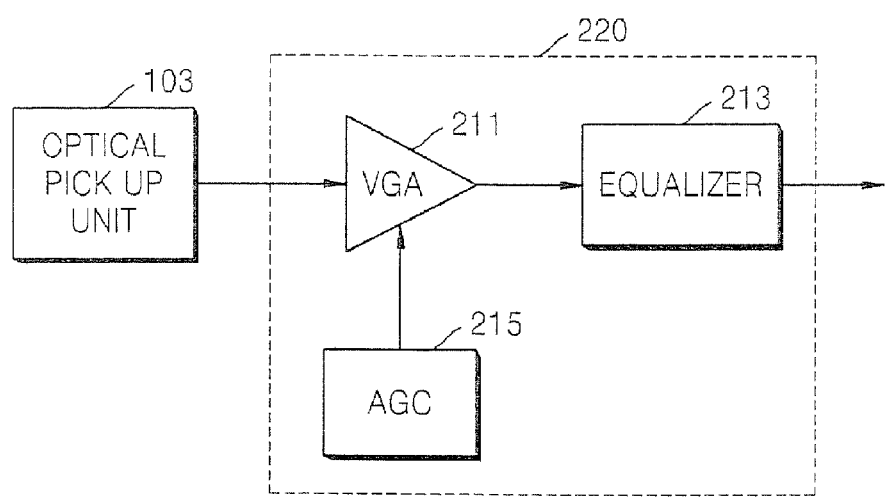
FIG. 2 is detailed view of an analog front end (AFE) unit which includes an equalizer according to certain embodiments of the present invention.

FIG. 2 illustrates an analog front end (AFE) unit 220 that includes an equalizer according to certain embodiments of the present invention. The AFE unit 220 may be used in the optical recording/reproducing apparatus 100 and/or in other electronic devices. As shown in FIG. 2, the AFE unit 220 includes a voltage gain amplifier (VGA) 211 and an equalizer 213. The AFE unit 220 may further include an automatic gain controller (AGC) 215.

Figure 1:
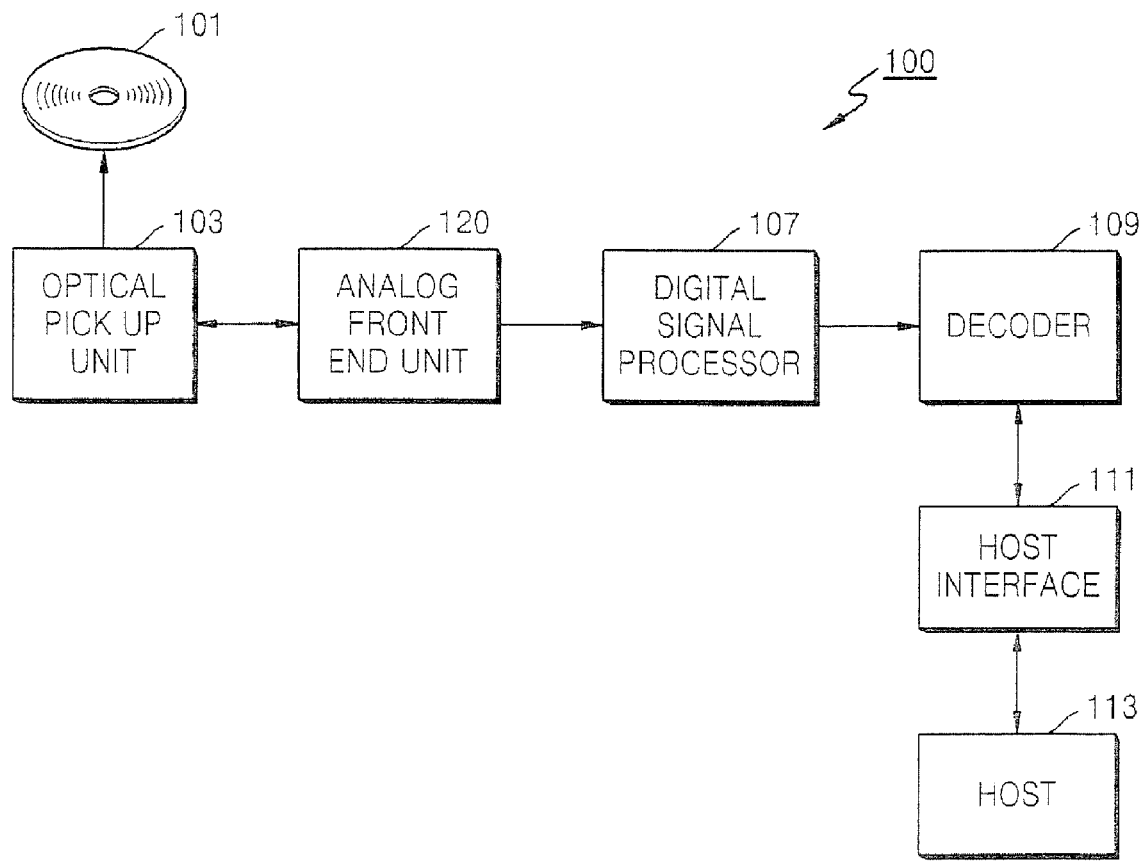
FIG. 1 illustrates a general optical recording/reproducing apparatus.

The VGA 211 may amplify radio frequency (RF) signals which may be received, for example, from an optical pick up unit such as optical pick up unit 103 of FIG. 1.

The equalizer 213 may amplify the RF signals in such a manner that the amplitudes of the RF signals are substantially identical for each period T. With most optical recording mediums such as, for example DVDs or CDs, during high speed reproduction the amplitude of the input signal to the AFE unit 220 decreases the further the location of the data from the center of the optical recording medium. In order to reduce or prevent such variation in the amplitude of the input signal, the equalizer 213 increases a gain value which is applied as the frequency of the used band is increased. The equalizer 213 may also control the group delay so that for all periods T each speed is regular.

The AGC 215 is operated in connection with the VGA 211 and automatically keeps the amplitudes of the RF signals substantially constant.

RF signals reproduced from an optical recording medium may comprise, for example, signals of periods 3T through 11T in the case of a CD, and signals of periods 3T through 14T in the case of a DVD. Due to the characteristics of a modulation transfer function (MTF), the amplitudes of these RF signals are gradually attenuated as the frequency is increased. In order to compensate for the RF signals which are attenuated with the increase in frequency, the gain value applied to the input RF signals is varied based on the frequency.

The equalizer 213 controls the group delay of the signals based on the frequency band. Group delay is sensitive to deviations in the manufacturing process, parasitic resistance (R) or parasitic capacitance (C) of a filter. Thus, errors may occur due to deviations in the manufacturing process, parasitic resistance, or parasitic capacitance.

Equalizers included in conventional optical recording/reproducing apparatus include an all pass filter in order to prevent the above-described group delay. However, the use an all pass filter may increase both the size and the power consumption of the equalizer.

The equalizers according to embodiments of the present invention can reduce or prevent group delay error without using an all pass filter. Embodiments of these equalizers will now be described with reference to FIGS. 3 through 5.

Figure 3:
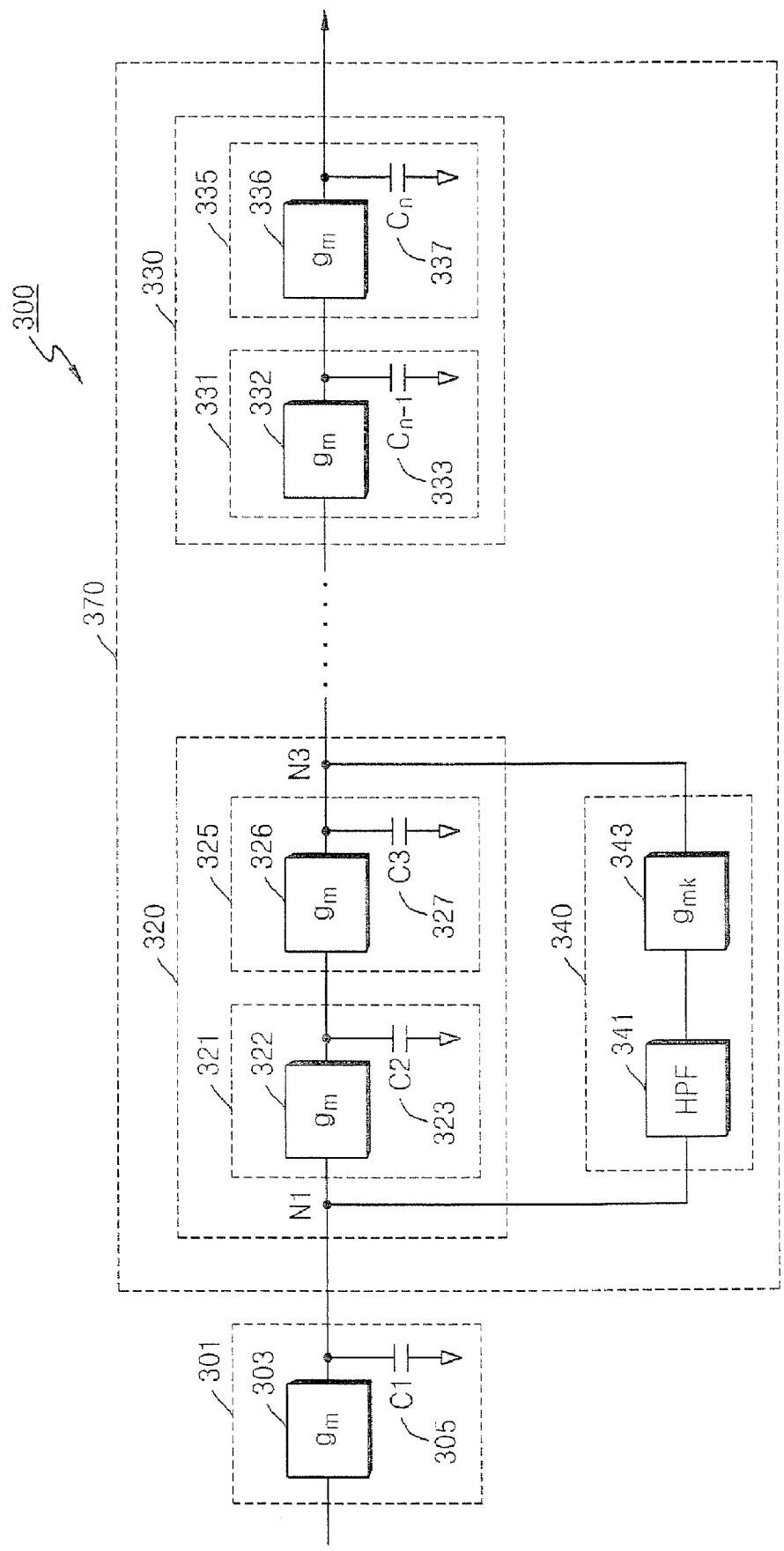
FIG. 3 illustrates an equalizer filter according to certain embodiments of the present invention.

FIG. 3 illustrates a filter 300 for an equalizer according to certain embodiments of the present invention. As shown in FIG. 3, the filter 300 includes a first low pass filter unit 301 and an equalization unit 370. The equalization unit 370 includes a plurality of biquad low pass filter units 320, 330 and a boosting block 340.

The first low pass filter unit 301 comprises a transconductance-capacitor $g_m$-C filter. The $g_m$-C filter includes a transconductance $g_m$ amplifier 303 and a capacitor C1 305 that is connected to an output terminal of the transconductance $g_m$ amplifier 303. The $g_m$-C filter functions as a low pass filter that passes signals having a frequency that is less than a predetermined frequency. This predetermined frequency is determined by the values of the transconductance $g_m$ and the capacitance C1.

The equalization unit 370 receives an output signal from the first low pass filter unit 301, and amplifies this output signal by applying a variable gain value. In certain embodiments of the present invention, the variable gain value may be a gain value that increases as data that is, for example, further from the center of a circular optical recording medium is input to the filter 300.

As is further shown in FIG. 3, the equalization unit 370 includes a plurality of biquad low pass filters units 320, 330, and a boosting block 340. A biquad low pass filter unit is a filter in which two low pass filters are connected in series. The filter 300 is formed of the serially connected biquad low pass filter units 320 and 330. Herein, the biquad low pass filter unit that receives the output of the low-pass filter unit 301 is called the first biquad low pass filter unit 320, and the biquad low pass filter unit which provides the output of the filter 300 (i.e., the $n^{th}$ or last stage) is called an $n^{th}$ biquad low pass filter unit 330. While only two biquad low pass filter units 320, 330 are depicted in FIG. 3, it will be appreciated that different numbers of biquad low pass filter units may be connected in series.

Each biquad low pass filter unit includes two $g_m$-C filters. For example, the first biquad low pass filter unit 320 includes $g_m$-C filters 321 and 325. Each $g_m$-C filter includes a transconductance $g_m$ amplifier and a capacitor. For example, the $g_m$-C filter 321 includes a $g_m$ amplifier 322 and a capacitor (C2) 323.

The boosting block 340 is connected in parallel to the first biquad low pass filter unit 320. That is, the boosting block 340 is connected between a first node N1 and a third node N3.

The boosting block 340 includes a high pass filter 341 and a $g_{mk}$ amplifier 343. The high pass filter 341 and the $g_{mk}$ amplifier 343 are connected in series.

The high pass filter 341 and the $g_{mk}$ amplifier 343 have symmetric zeros. As the first biquad low pass filter unit 320 has two poles, and the boosting block 340 generates a pair of symmetric zeros, the filter 300 can vary a gain value in a predetermined frequency section without being affected by a phase shift.

The gain value is determined by a resistance R (see FIG. 5) included in the high pass filter 341, a capacitor ($C_H$) (see FIG. 5) included in the high pass filter 341, and a $g_{mk}$ value.

In the filter 300, group delay caused during equalization can be controlled and compensated for by, for example, controlling the value of the capacitor ($C_n$) that is connected to the output terminal of the filter 300. The value of capacitor $C_n$ is controlled by measuring group delay values while varying the values of a capacitor and selecting a capacitor value at which group delay is at a minimum.

Figure 4:
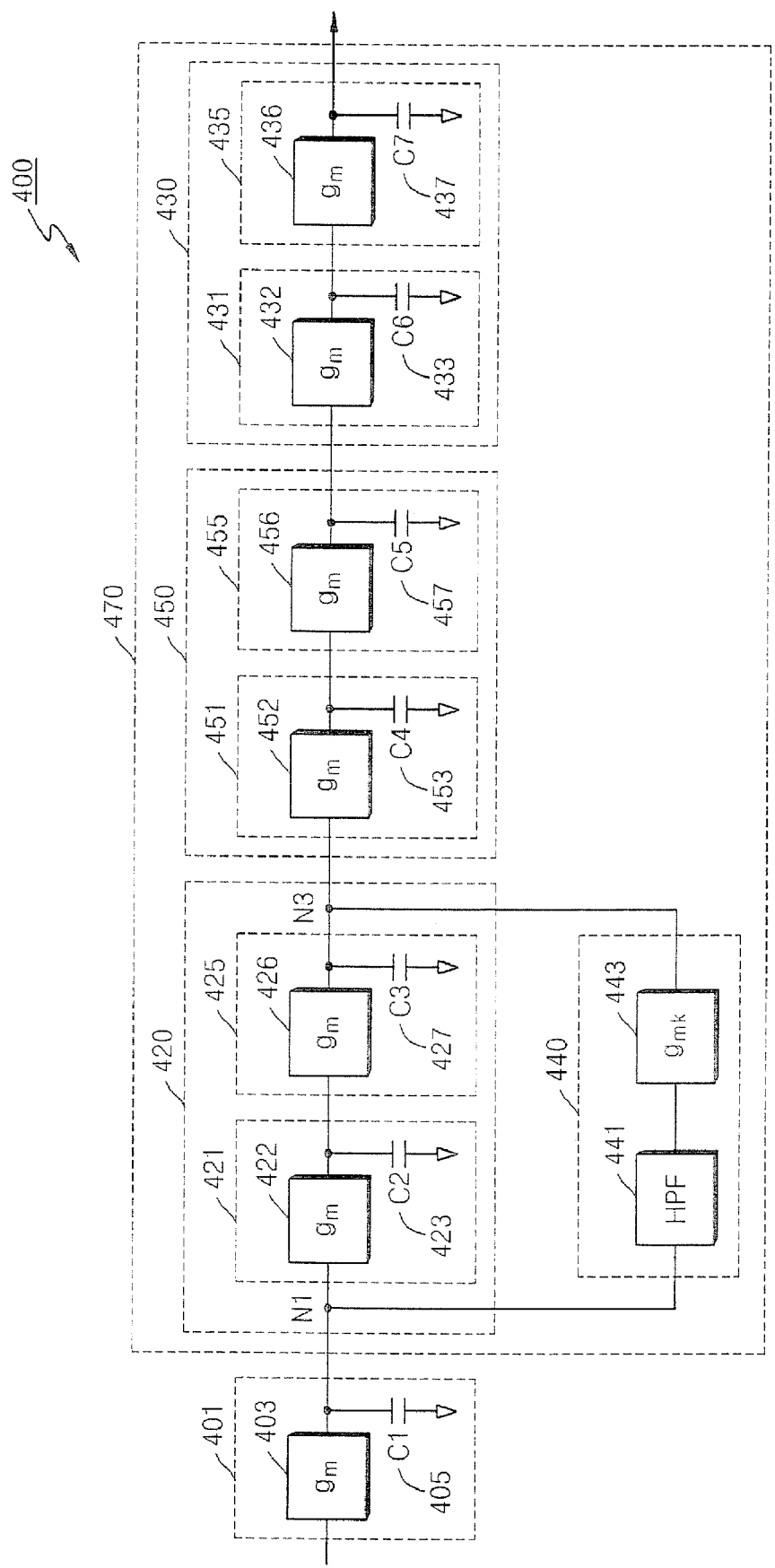
FIG. 4 illustrates an equalizer filter according to further embodiments of the present invention.

Hereinafter, processes for controlling and compensating group delay values will be described with reference to an example filter that includes three biquad low pass filter units, which is illustrated in FIG. 4.

FIG. 4 illustrates a filter 400 for an equalizer according to further embodiments of the present invention.

As shown in FIG. 4, the filter 400 includes three biquad low pass filter units 420, 450, and 430 which are connected in series to a first low pass filter unit 401. The first low pass filter unit 401 includes one low pass filter, and the three biquad low pass filter units include a total of six low pass filters, and thus, the filter 400 is a seventh order filter. Here, a seventh-order equiripple 0.05 degree delay filter will be explained as an example. The following equations are polynomials and factors that are regulated as specifications for each filter that is used.

[Equation 1]

$$(S+0.8613) \tag{1}$$

$$(S^2+1.6850S+1.3170) \tag{2}$$

$$(S^2+1.5420S+2.9514) \tag{3}$$

$$(S^2+1.6850S+1.3170) \tag{4}$$

Equation 1 is a polynomial that is determined by a specification for the case when the filter 400 of FIG. 4 is regulated as a seventh-order equiripple 0.05 degree delay filter. S in each of sections (1), (2), (3), and (4) can be obtained according to Equation 1. Each of the values of S is as follows:

$$(S+0.8613): S=-0.8613 \tag{5}$$

$$(S^2+1.6850S+1.3170): S=-0.8425+j0.7792, -0.8425-j0.7792 \tag{6}$$

$$(S^2+1.5420S+2.9514): S=-0.771+j1.5352, -0.771+j1.5352 \tag{7}$$

$$(S^2+1.6850S+1.3170): S=-0.5728+j2.2454, -0.5728-j2.2454 \tag{8}$$

In the sections (2), (3), and (4), if S is in the form of a+jb, the value of a capacitor is calculated by Equation 2 below.

$$C_{k+1} = \frac{2a}{a^2+b^2}, C_{k+2} = \frac{1}{2a}, \quad \text{[Equation 2]}$$

where $C_{(k+1)}$ denotes a first capacitor of a biquad low pass filter unit that is connected to a $k^{th}$ stage of the equalization unit 470, and $C_{(k+2)}$ denotes a second capacitor of a biquad low pass filter that is connected to a $k^{th}$ stage of the equalization unit 470. For example, when k=1, $C_{k+1}$ is capacitor 423 (i.e., the first capacitor of the first biquad low pass filter unit 420) in FIG. 4 and $C_{k+2}$ is capacitor 427 (i.e., the second capacitor of the first biquad low pass filter unit 420) in FIG. 4.

Consequently, the values of sections (5), (6), (7), and (8) are applied to Equation 2 to calculate a value of each capacitor, and the values of the capacitors are as follows:

C1=1.1610

C2=1.2795, C3=0.5935

C4=0.5224, C5=0.6485

C6=0.2133, C7=0.8729

The delay characteristic of the filter is determined by Q factors, that is, Q1, Q2, and Q3, which have the following values:

$$Q1 = \sqrt{\frac{C3}{C2}}, Q2 = \sqrt{\frac{C5}{C4}}, Q3 = \sqrt{\frac{C7}{C6}}$$

Regarding group delay generated in the seventh-order equiripple 0.05 degree filter, a low-frequency section is influenced by Q1, a mid-frequency region is influenced by Q2, and a high-frequency region is influenced by Q3.

Accordingly, in the high-frequency region where group delay is a problem, the group delay can be compensated by controlling Q3. That is, by controlling the values of capacitors (C6, C7) included in the last biquad low pass filter unit 430, the group delay can be controlled and compensated for. In particular, since in some embodiments just the value of the capacitor (C7) connected at the last terminal is controlled, the overall influence of the capacitors on the filter 400 can be minimized. In addition, the group delay value can be compensated for by controlling Q3 which has an influence on the group delay characteristics of the filter 400.

Figure 5:
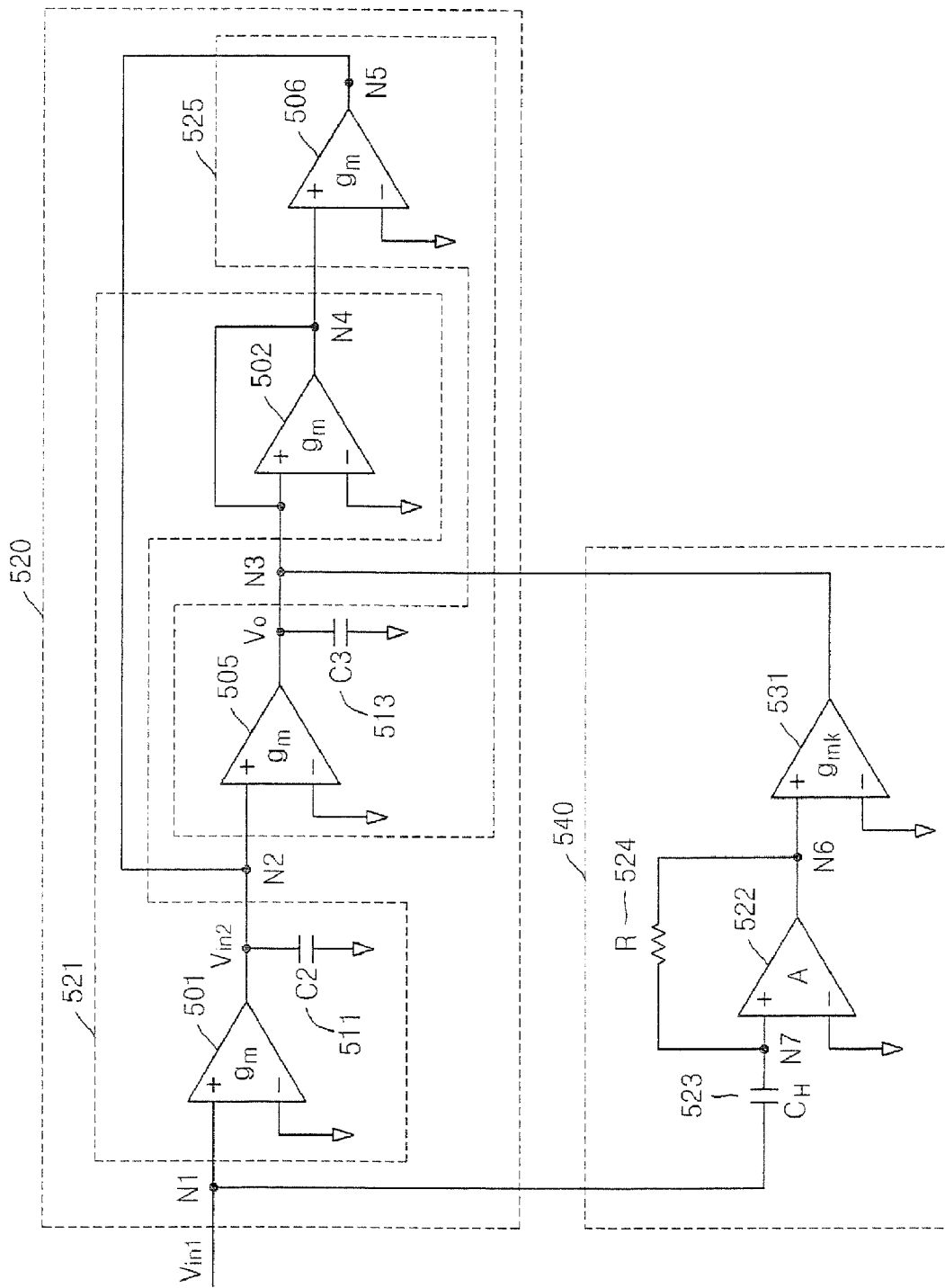
FIG. 5 illustrates a boosting block and a first biquad low-pass filter unit according to certain embodiments of the present invention.

FIG. 5 illustrates a boosting block 540 and a biquad low pass filter unit 520 according to embodiments of the present invention that may be used, for example, as the boosting block 440 and the first biquad low-pass filter unit 420 of FIG. 4.

As shown in FIG. 5, the boosting block 540 and the first biquad low pass filter unit 520 include a plurality of $g_m$ amplifiers and a plurality of capacitors. In particular, the first biquad low pass filter unit 520 includes four $g_m$ amplifiers 501, 502, 505, and 506 and two capacitors (C2, C3) 511 and 513. Specifically, the low pass filter unit 521 includes $g_m$ filters 501 and 502 and a capacitor (C2) 511, and the low pass filter unit 525 includes $g_m$ filters 505 and 506 and a capacitor (C3) 513. The high pass filter unit of the boosting block 540 includes a capacitor ($C_H$) 526 and an amplifier 522 whose gain value is A. A $g_{mk}$ amplifier 531 is connected to an output terminal of the amplifier 522. As the first biquad low pass filter unit 520 and the boosting block 540 are connected in parallel, a gain value can be varied in a predetermined frequency section regardless of the above-described phase shift. The operations of this variation of a gain value will be described hereinafter with reference to the following equations.

By applying Kirchhoff's Current Law (KCL) to a second node N2, a third node N3, and a seventh node N7, Equation 3 as below can be obtained.

[Equation 3]

$$v_{in2} = \frac{1}{SC_1}(v_{in2}g_m - v_o g_m) \quad (9)$$

$$v_o = \frac{1}{SC_2}(v_{in2}g_m - v_o g_m + v_{in3}g_{mk}) \quad (10)$$

$$S \times C_H \times v_{in1} + \frac{v_{in3}}{R} = 0 \quad (11)$$

When equations (9) and (11) are substituted for equation (10), the result is as follows.

$$v_o = \frac{1}{SC_2}\left[\frac{1}{SC_1}(v_{in1}g_m - v_o g_m)g_m - v_o g_m + v_{in3}g_{mk}\right]$$

$$v_o = \frac{1}{SC_2}\left[\frac{1}{SC_1}(v_{in1}g_m - v_o g_m)g_m - v_o g_m + RSC_H v_{in1}g_{mk}\right]$$

$$v_o\left[1 + \frac{g_m^2}{S^2 C_2 C_1} + \frac{g_m}{SC_2}\right] = v_{in1}\left[\frac{g_m^2}{S^2 C_2 C_2} - \frac{RSC_H g_{mk}}{SC_2}\right]$$

Thus, when these resultant equations are converted into a response function, the following equation is obtained.

$$\frac{v_o}{v_{in1}} = \frac{\left[\frac{g_m^2}{C_2 C_2} - S^2 \frac{RC_H g_{mk}}{C_2}\right]}{\left[S^2 + S\frac{g_m}{C_2} + \frac{g_m^2}{C_2 C_1}\right]} \quad (12)$$

Referring to equation (12), one pair of symmetric zeros are generated in the numerator, and two poles are generated in the denominator.

Accordingly, the filter 400 according to certain embodiments of the present invention can vary a gain value in a predetermined frequency section generally without being influenced by a phase variation. As the gain value is determined by a constant in the numerator of equation (12), the gain value is determined by a resistance (R) 526, a capacitance ($C_H$) of the high pass filter unit, and a transconductance value of a $g_{mk}$ amplifier 531.

Figure 6:
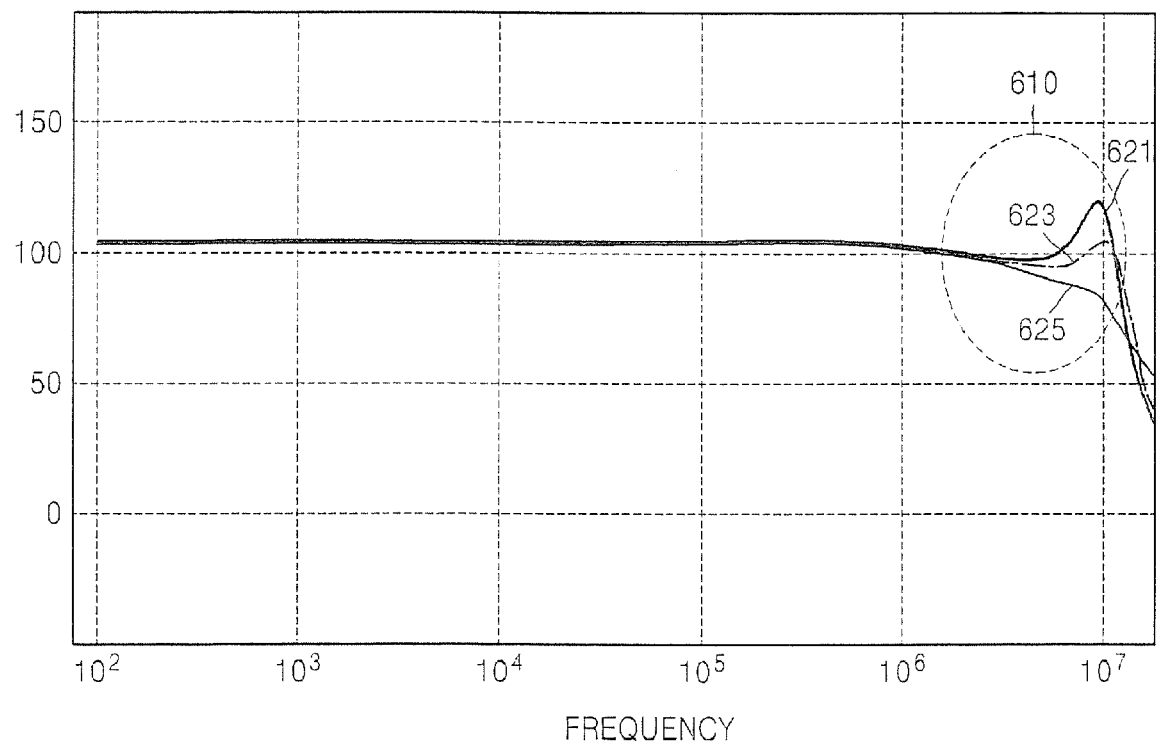
FIG. 6 is a graph showing the results of a simulation obtained using filters according to embodiments of the present invention.

FIG. 6 is a graph showing the results of a simulation of the filter 400 according to certain embodiments of the present invention.

When no control measurement is performed, a frequency-gain value graph is a curve 623. If identical gain values that are required for equalizing are applied to all frequency sections, a frequency-gain curve should be parallel because the gain value applied to each of the frequencies is the same. However, as can be seen from the curve 623, the gain value varies in a direction toward a high frequency region 610. That is, the amplitude of RF signals which are detected from a disk decreases toward the high frequency region, and thus the applied gain value increases. As described above, the group delay characteristic usually varies in the high frequency region because of a phase leading or phase lagging phenomenon.

Curves 621 and 625 are frequency-gain curves obtained when the value of the capacitor (C7) included at the end terminal of the seventh-order equiripple 0.05 degree delay filter in FIG. 4 is controlled. According to the current embodiment, by controlling the value of the capacitor (C7) included at the end terminal, group delay can be increased by 20% (shown by curve 621) or reduced by 20% (shown by curve 625) compared to a normal state.

In other words, by controlling the value of the capacitor (C7), the variation in group delay may be compensated for and data errors due to group delay can be reduced or prevented.

Illustrative embodiments of the present invention have been disclosed herein, and although specific terms are employed, they are used and are to be interpreted in a generic and descriptive sense only and not for purposes of limitation. Accordingly, it will be understood by those of ordinary skill in the art that various changes in form and details may be

What is claimed is:

1. A filter for an equalizer, the filter comprising:
   a first low-pass filter unit that is configured to receive an input signal; and
   an equalization unit that is configured to receive an output signal of the first low-pass filter unit and that is configured to amplify the received output signal with a variable gain value,
   wherein the equalization unit comprises a plurality of serially connected biquad low-pass filter units, and is configured to control a value of a capacitor of the last of the plurality of biquad low-pass filter units to control a group delay value that is generated during equalization.

2. The filter of claim 1, wherein the output of the low pass filter unit is received by a first of the serially connected biquad low-pass filter units, and wherein the equalization unit further comprises a boosting block that is connected in parallel to the first of the plurality of serially connected biquad low-pass filter units.

3. The filter of claim 2, wherein each of the biquad low-pass filter units comprises two transconductance-capacitor $g_m$-C filters.

4. The filter of claim 3, wherein the first low-pass filter unit comprises a transconductance-capacitor $g_m$-C filter.

5. The filter of claim 2, wherein the boosting block comprises a high-pass filter unit and a $g_{mk}$ amplifier that is serially connected to the high-pass filter, and is configured to generate a pair of symmetric zeros.

6. The filter of claim 5, wherein the pair of symmetric zeros are combined with one pair of symmetric pole values which are generated in the biquad low-pass filter units, and equalize the input signal to have a predetermined amplitude.

7. The filter of claim 5, wherein the first low-pass filter unit comprises:
   a first $g_m$ filter that is configured to receive and amplify the input signal; and
   a first capacitor that has an input terminal that is connected to an output terminal of the first $g_m$ filter.

8. The filter of claim 7, wherein the plurality of serially connected biquad low-pass filter units unit comprises n biquad low-pass filter units that form a second amplifier, wherein a k-th biquad low-pass filter unit indicates the biquad low-pass filter connected to $k^{th}$ of the n biquad low-pass filter units, where k is an integer having a value in the range $1 \leq k \leq n$, and
   wherein the $k^{th}$ biquad low-pass filter unit comprises:
   a first $g_m$ amplifier that has an input terminal that is connected to an output terminal of a $(k-1)^{th}$ biquad low-pass filter unit;
   a second $g_m$ amplifier that has an input terminal that is connected to an output terminal of the first $g_m$ amplifier, and that has an output terminal that is connected to an input terminal of the $(k+1)^{th}$ biquad low-pass filter unit;
   a third $g_m$ amplifier that has an input terminal that is connected to the output terminal of the second $g_m$ amplifier, and that has an output terminal that is connected to the output terminal of the second $g_m$ amplifier;
   a fourth $g_m$ amplifier that has an input terminal that is connected to an output terminal of the third $g_m$ amplifier and that has an output terminal that is connected to the output terminal of the first $g_m$ amplifier;
   a second capacitor that has a first terminal that is connected to the output terminal of the first $g_m$ amplifier and a second terminal that is connected to a reference voltage; and
   a third capacitor that has a first terminal that is connected to the output terminal of the second $g_m$ amplifier and a second terminal that is connected to the reference voltage.

9. The filter of claim 7, wherein the first biquad low-pass filter unit comprises:
   a first $g_m$ amplifier that has an input terminal that is connected to an output of the first $g_m$ amplifier of the first low-pass filter unit;
   a second $g_m$ amplifier that has an input terminal that is connected to an output terminal of the first $g_m$ amplifier and that has an output terminal that is connected to an input terminal of a second biquad low-pass filter unit;
   a third $g_m$ amplifier that has as input terminal that is connected to an output terminal of the second $g_m$ amplifier and that has an output terminal that is connected to the output terminal of the second $g_m$ amplifier;
   a fourth $g_m$ amplifier that has an input terminal that is connected to an output terminal of the third $g_m$ amplifier and that has an output terminal that is connected to the output terminal of the first $g_m$ amplifier;
   a second capacitor that has a first terminal that is connected to the output terminal of the first $g_m$ amplifier and a second terminal that is connected to a reference voltage; and
   a third capacitor that has a first terminal that is connected to the output terminal of the second $g_m$ amplifier and a second terminal that is connected to a reference voltage.

10. The filter of claim 9, wherein the boosting block further comprises:
    an amplifier that has an input terminal that is connected to a terminal of the high-pass filter; and
    a resistance that is connected between the input terminal of the amplifier and an input terminal of the $g_{mk}$ amplifier,
    wherein the input terminal of the $g_{mk}$ amplifier is connected to an output terminal of the amplifier, and
    wherein the resistance is connected between the input terminal of the amplifier and the input terminal of the $g_{mk}$ amplifier.

11. The filter of claim 7, wherein the plurality of serially connected biquad low-pass filter units comprises three serially connected biquad low-pass filter units.

12. The filter of claim 11, wherein the first biquad low-pass filter comprises:
    a second $g_m$ filter that has an input terminal that is connected to the output terminal of the first $g_m$ filter;
    a second capacitor that has a terminal that is connected to the output terminal of the second $g_m$ filter;
    a third $g_m$ filter that has an input terminal that is connected to the output terminal of the second $g_m$ filter; and
    a third capacitor that has a terminal that is connected to an output terminal of the third $g_m$ filter.

13. The filter of claim 12, wherein the second biquad low-pass filter unit comprises:
    a fourth $g_m$ filter that has an input terminal that is connected to the output terminal of the third $g_m$ filter;
    a fourth capacitor that has a terminal that is connected to an output terminal of the fourth $g_m$ filter;
    a fifth $g_m$ filter that has an input terminal that is connected to the output terminal of the fourth $g_m$ filter; and
    a fifth capacitor that has a terminal that is connected to an output terminal of the fifth $g_m$ filter.

14. The filter of claim 13, wherein the third biquad low-pass filter unit comprises:
- a sixth $g_m$ filter that has an input terminal that is connected to the output terminal of the fifth $g_m$ filter;
- a sixth capacitor that has a terminal that is connected to an output terminal of the sixth $g_m$ filter;
- a seventh $g_m$ filter that has an input terminal that is connected to the output terminal of the sixth $g_m$ filter; and
- a seventh capacitor that has a terminal that is connected to the output terminal of the seventh $g_m$ filter.

15. The filter of claim 14, wherein the filter controls a group delay value which is generated during equalization by controlling the value of the seventh capacitor.

16. A filter for an equalizer, the filter comprising:
- an equalization unit that includes a plurality of serially connected biquad low-pass filters and an adjustable capacitor, wherein the equalization unit is configured to amplify an input signal with a variable gain and to control a group delay value that is generated during equalization; and
- a filter having an output that is connected to an input of the equalization unit.

17. The filter of claim 16, wherein the adjustable capacitor is part of one of the biquad low-pass filters, and wherein the filter is a low pass filter.

18. The filter of claim 17, wherein each of the biquad low-pass filter units comprises two transconductance-capacitor $g_m$-C filters and wherein the low-pass filter unit comprises a transconductance-capacitance $g_m$-C filter.

19. The filter of claim 18, further comprising a high-pass filter unit and a $g_{mk}$ amplifier that is serially connected to the high-pass filter, wherein the serially connected high-pass filter unit and $g_{mk}$ amplifier are connected in parallel to a first of the plurality of serially connected biquad low-pass filters.

20. The filter of claim 19, wherein the first low-pass filter unit comprises:
- a $g_m$ filter that is configured to receive and amplify the input signal; and
- a capacitor that has an input terminal that is connected to an output terminal of the $g_m$ filter.

21. A method of processing an output signal of an optical pick-up unit, the method comprising:
- passing the output signal of the optical pick-up unit through a filter;
- adjusting a value of a capacitor of an equalization unit to reduce a group delay characteristic of the equalization unit for the filtered output signal; and
- passing the filtered output signal through the equalization unit.

22. The method of claim 21, wherein the filter is a low-pass filter, and wherein the equalization unit includes a high pass filter and a $g_{mk}$ amplifier coupled in parallel to one or more of a plurality of filter stages included in the equalization unit.

23. The method of claim 22, wherein the plurality of filter stages comprise a plurality of serially connected biquad low-pass filters.

24. The method of claim 23, wherein the gain value is based on a resistance value and a capacitance value associated with the high pass filter and a $g_{mk}$ value of the $g_{mk}$ amplifier.

25. The method of claim 24, wherein the capacitor is part of the last of the plurality of serially connected biquad low-pass filters.

* * * * *